United States Patent
Coffey et al.

(10) Patent No.: US 7,170,714 B2
(45) Date of Patent: Jan. 30, 2007

(54) MAGNETIC HEAD HAVING A HEATER CIRCUIT FOR THERMALLY-ASSISTED WRITING

(75) Inventors: Kevin Robert Coffey, Morgan Hill, CA (US); Jeffrey Scott Lille, Sunnyvale, CA (US); Andrew Ching Tam, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/253,494

(22) Filed: Oct. 17, 2005

(65) Prior Publication Data

US 2006/0028765 A1    Feb. 9, 2006

Related U.S. Application Data

(62) Division of application No. 10/213,230, filed on Aug. 6, 2002, now Pat. No. 7,006,336.

(51) Int. Cl.
*G11B 5/127* (2006.01)

(52) U.S. Cl. ..................................... 360/128
(58) Field of Classification Search ............... 360/128, 360/126, 125, 123, 313; 219/216
See application file for complete search history.

(56) References Cited

U.S. PATENT DOCUMENTS

| | | | | |
|---|---|---|---|---|
| 5,991,113 A | * | 11/1999 | Meyer et al. | 360/75 |
| 6,317,280 B1 | * | 11/2001 | Nakajima et al. | 360/59 |
| 6,493,183 B1 | * | 12/2002 | Kasiraj et al. | 360/126 |
| 6,940,691 B2 | * | 9/2005 | Maat | 360/126 |
| 2005/0013034 A1 | * | 1/2005 | Margulies et al. | 360/59 |
| 2005/0225899 A1 | * | 10/2005 | Maat | 360/128 |
| 2006/0028764 A1 | * | 2/2006 | Lille | 360/126 |
| 2006/0187583 A1 | * | 8/2006 | Lou et al. | 360/128 |

\* cited by examiner

*Primary Examiner*—Allen Cao
(74) *Attorney, Agent, or Firm*—Zilka-Kotab, PC (57) ABSTRACT

A magnetic head for thermally-assisted writing of data to a disk is disclosed. In one illustrative example, the magnetic head includes a write head element and a heating element which is a resistive infared radiator. The heating element is coupled to at least one via pad which is exposed on an outer surface of the magnetic head. This via pad may be the same pad utilized for the write head element or for a read sensor. The heating element is formed beneath or within the pole tip such that it is able to transfer heat to a portion of the disk before the write head element can write data to it Advantageously, the heater facilitates the writing of data to high coercivity media.

2 Claims, 7 Drawing Sheets

MAGNETIC HEAD HAVING A HEATER CIRCUIT FOR THERMALLY-ASSISTED WRITING

RELATED APPLICATIONS

This application is a divisional of U.S. patent application Ser. No. 10/213,230 and filed Aug. 6, 2002, now U.S. Pat. No 7,006,336 B2.

FIELD OF THE INVENTION

This invention relates generally to magnetic heads in disk drives, and more particularly to magnetic write heads having heating elements for thermally-assisted writing.

BACKGROUND OF THE INVENTION

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically on the order of about 0.02 µm.

One on-going objective in the industry is to improve or increase the amount of data that can be stored on a disk, and to design magnetic heads which can adequately read from and write data to these disks. One promising technique to increase the disk storage capacity is heat-assisted magnetic recording (HAMR), which may also be referred to as optically-assisted magnetic recording or thermally-assisted magnetic recording. This technique utilizes a recording medium that has a higher coercivity than current media so that it has more resistance to thermal instability at normal operating temperatures. Therefore, more data can be adequately stored on the media. Unfortunately, a higher coercivity means that the platter tends to resist reacting to magnetic fields at typical operating temperatures. Therefore, it is difficult to write data to such media. To sufficiently write data to high coercivity media, a disk drive needs to heat a writable portion of the disk to lower its coercivity as the write head writes data thereto.

Both HAMR and magneto-optical (MO) disk drives can utilize lasers to the heat a portion of the recording media in order to lower its coercivity. When reading data, however, HAMR drives read directly from the disk using a conventional GMR head. On the other hand, MO drives bounce light off the disk and read bits from changes in the laser beam with an optical sensor. The downside of using a laser for heating is the finite spot size of the laser spot. This spot is typically at the diffraction limit of the light. In addition, the wavelength of the light is not easily scalable to shorter wavelengths to achieve smaller heated areas of the disk.

Accordingly, what is needed is a magnetic head which provides for an increased amount of data to be stored on a disk, as well as improvements and alternatives to the prior art.

SUMMARY OF THE INVENTION

A magnetic head for thermally-assisted writing is described herein. In one illustrative embodiment of the invention, the magnetic head includes a write head element and a heating element which is a resistive infrared radiator. The heating element is coupled to at least one via pad which is exposed on an outer surface of the magnetic head. This via pad may be the same pad utilized for the write head element or a read sensor of the magnetic head. The heating element is formed beneath or within the pole tip such that it is able to transfer heat to a portion of the disk before the write head element can write data to it Advantageously, the heater facilitates the writing of data to high coercivity media.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
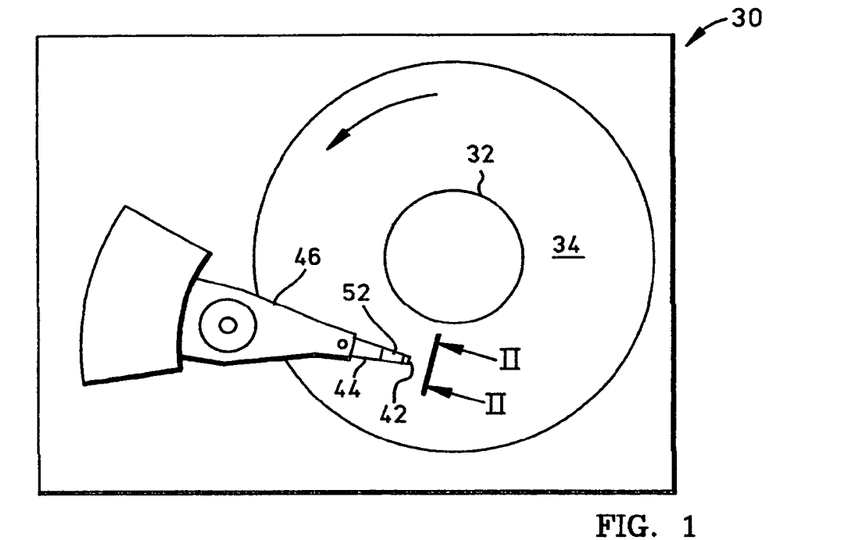
FIG. 1 is a planar view of an exemplary magnetic disk drive.
Figure 2:
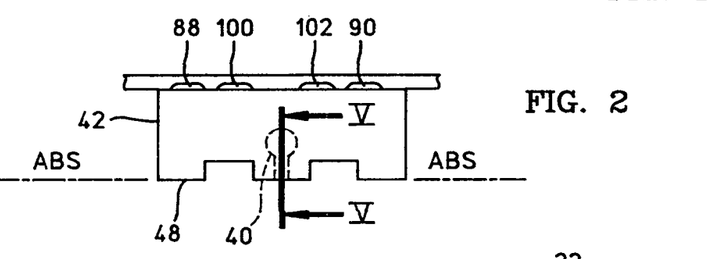
FIG. 2 is an end view of a slider with a magnetic head of the disk drive as seen in plane II—II.
Figure 3:
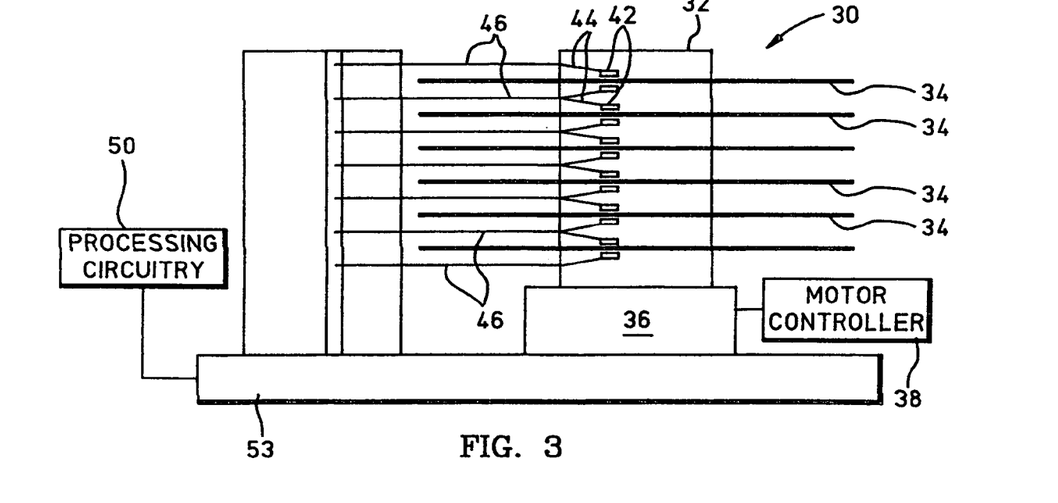
FIG. 3 is an elevation view of the magnetic disk drive wherein multiple disks and magnetic heads are employed.

Referring now to the drawings, wherein like reference numerals designate like or similar parts throughout the several views, which is illustrated in FIGS. 1–3 showing a magnetic disk drive 30. Drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of the magnetic disk 34. When disk 34 is rotated by motor 36, the slider is supported on a thin (typically, 0.02.mu.m) cushion of air (air bearing) between the disk and an air bearing surface (ABS) 48.

Figure 4:
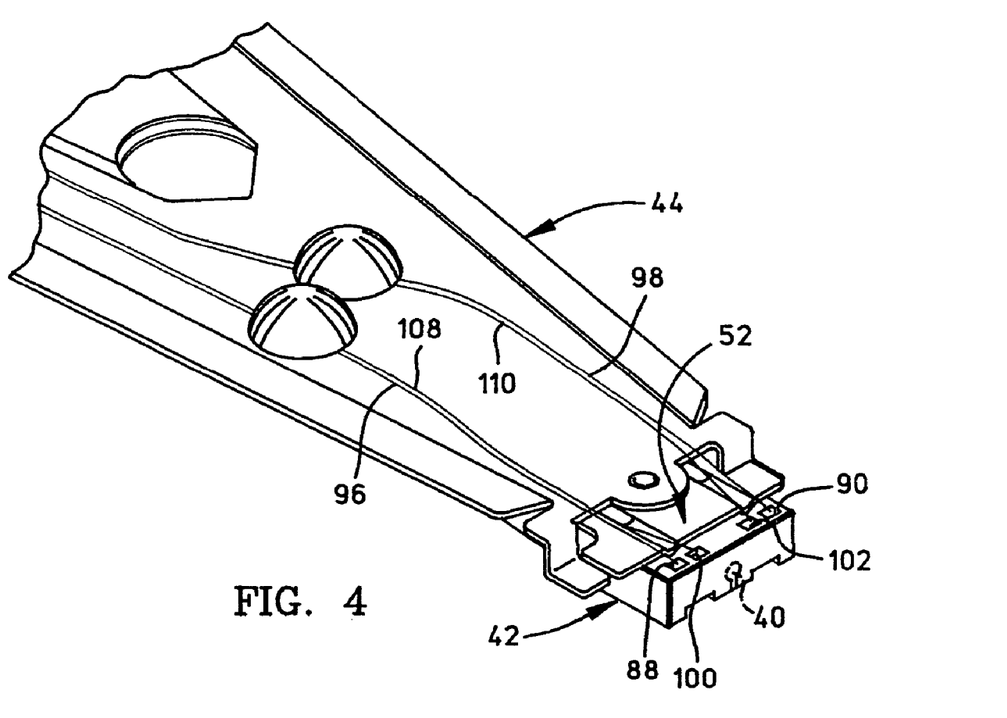
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

Figures 5, 7:
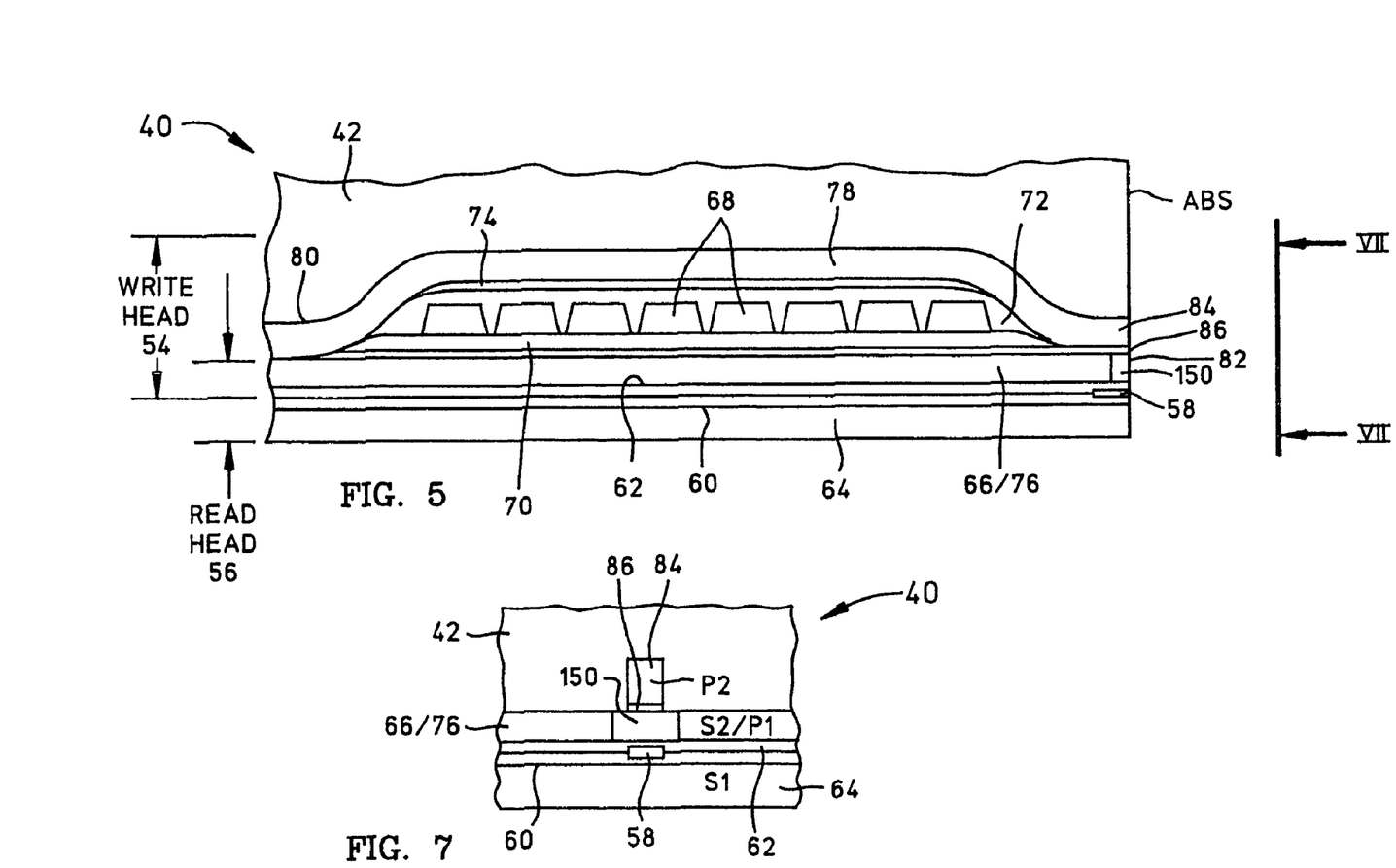
FIG. 5 is a partial elevation view of the slider and magnetic head as seen in plane V—V of FIG. 2, which reveals a heating element of the present invention.
FIG. 7 is a partial ABS view of the slider taken along plane VII—VII of FIG. 5 to show the read and write elements of the magnetic head, as well as the heating element of the present invention.

FIG. 5 shows a side cross-sectional elevation view of a merged magnetoresistive (MR) head 40 having a write head portion 54 and a read head portion 56. In the present application, write head portion 54 and read head portion 56 may be referred to as a write head element and a read head element, respectively. Read head portion 56 includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through the sensor causes these resistance changes to be manifested as potential changes, which are processed by processing circuitry 50 shown in FIG. 3.

Write head portion 54 of FIG. 5 includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to as an "insulation stack". Coil layer 68, and first, second and third insulation layers 70, 72 and 74, are sandwiched between first (P1) and second (P2) pole piece layers 76 and 78. First and second pole piece layers 76 and 78 are magnetically coupled at a back gap 80, and have first (P1) and second (P2) pole tips 82 and 84 that are separated by a non-magnetic gap layer 86 at the ABS.

A heating element 150 is also formed on or within the write head element. In the embodiment shown, heating element 150 is formed on and under first pole tip 82 and exposed at the ABS. If heating element 150 is formed within first pole tip 82, it will not be exposed in the ABS view as shown in FIG. 7. Heating element 150 is aligned with second pole tip 84 (see FIG. 7) such that it is able to transfer heat to a writable portion of the disk just before the write head element writes data to it. The top surface of the disk is located below or in contact with the ABS of head 40.

Figure 6:
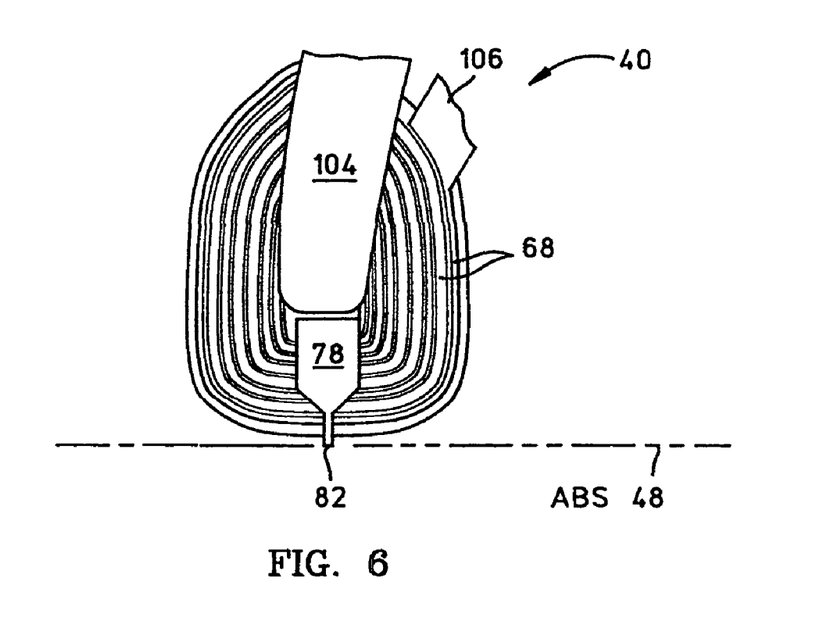
FIG. 6 is a top view of the second pole piece and coil layer, a portion of which is shown in FIG. 5, with all insulation material removed.

Referring back to FIGS. 2 and 4, first and second read pads 88 and 90 connect leads (not shown) from the MR sensor 58 to leads 96 and 98 on suspension 44. Similarly, first and second write pads 100 and 102 connect leads 104 and 106 from write coil 68 (FIG. 6) to leads 108 and 110 on suspension 44. However, the relative location of read and write pads on a slider may vary. In one embodiment, heating element 150 of FIGS. 5 and 7 is coupled to both write pads 100 and 102 of FIGS. 2 and 4 and driven by the write coil. In another embodiment, the heating element is coupled to two separate heater pads (not shown in FIGS. 2 and 4) which are exposed on slider 42 and driven by a separate heater driver circuit (not shown in FIGS. 2 and 4) which is coupled to these heater pads. In another alternative, the heating element is coupled to one of write pads 100 and 102 (which may be grounded) and another separate heater pad (not shown in FIGS. 2 and 4) exposed on slider 44. In this case, the heating element is driven by the heater driver circuit which is coupled to the separate heater pad as well (and may be grounded). Preferably, the heater driver circuit is not exposed on the outside of the magnetic head but is contained at a location away therefrom. For example, the heater driver circuit may be included in the same area where the arm electronics (AE) are located, or on the circuit board card attached to the base of the drive. The above-described embodiments will be detailed later in relation to FIGS. 11–13.

Figures 8, 9:
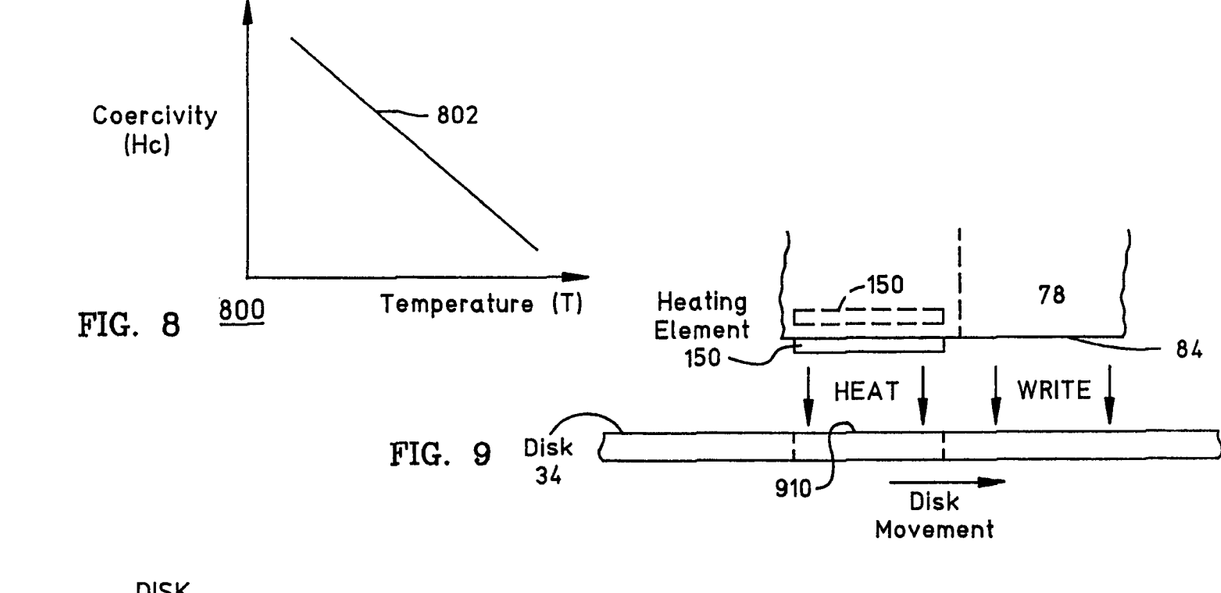
FIG. 8 is a graph which shows the basic relationship between temperature (T) and a disk's variable coercivity ($H_c$)
FIG. 9 is simplified cross-sectional view of the disk and the magnetic head having the heating element.

FIG. 8 is a graph 800 which illustrates the basic relationship between temperature (x-axis) and media coercivity $H_C$ (y-axis). A curve 802 shown in graph 800 reveals that the coercivity of writable media, such as a magnetic disk, decreases as its temperature increases. Although shown as a linear relationship in FIG. 8 for simplicity, the relationship between temperature and coercivity may or may not be linear. In the present state-of-the-art, a conventional magnetic disk has a coercivity of between about 2000 and 4000 Oerosteds at typical operating temperatures and can store between about 1 Gb/in$^2$ and 60 Gb/in$^2$ of data. On the other hand, disks utilized in connection with the present invention have higher coercivities than such conventional disks, between about 4000 and 10000 Oerosteds at typical operating temperatures. Therefore, these disks can store between about 80 Gb/in$^2$ and 500 Gb/in$^2$ of data. For such a disk to be sufficiently written to, a writable portion of the disk is heated to between about 80 and 300 degrees Celsius to lower its coercivity to between about 2000 and 6000 Oerosteds. As described herein, the heating element of the magnetic head is the component which provides the heat to lower the disk's coercivity. Note that the coercivities and storage capacities just described are merely those which are suitable values at the present time and will likely change in the future.

FIG. 9 is a simplified cross-sectional view of heating element 150, disk 34, and pole tip 82. As illustrated, heating element 150 is formed beneath or under pole piece 66/76 at the ABS. Heating element 150 is positioned on the write head element such that is aligned with second pole tip 84 so that heat can be thermally transferred to a writable portion 910 of disk 34 before data is written to it When energized, heating element 150 heats up a portion of the slider (e.g., a portion of first pole piece 76) through radiation or conduction (thermal contact) and writable disk portion 910 will be underneath pole tip 82 and remain at an elevated temperature when being written to. By heating up the writable disk portion, the bits therein are made writable such that the write head element can write data thereto. The exact location of the heating element may vary and, as illustrated in dashed lines in FIG. 9, it may be formed within the pole tip where it is not exposed at the ABS.

Preferably, heating element 150 is an electrically resistive heater (i.e. a resistive infared radiator) which rises in temperature when an electrical current flows through it Heating element 150 has a high resistance, preferably between about 25 and 250 ohms, which does not vary significantly when energized. When energized, heating element 150 heats up to a steady-state temperature of between about 80–400 degrees Celsius. For example, heating element 150 may have a predetermined steady state temperature of 150 degrees Celsius when data is being written. Also, the heating element may have a power dissipation of between about 5 and 20 milliwatts, or more particularly a power dissipation of about 10 milliwatts.

Heating element 150 is made of a suitable conductive material, preferably a metal or metal alloy such as tantalum, which is formed underneath the pole piece by sputter deposition. Heating element 150 may be made of a NICHROME.™. material, which is basically an alloy of nickel and chromium. NICHROME.™. is a registered trademark of the Driver-Harris Company. The leads to heating element 150 are also made of a conductive material, such as platinum or an alloy of nickel. An additional layer of metal, such as copper (Cu), may be formed underneath heating element 150 to carry heat away from the magnetic head.

FIGS. 11–18 are various embodiments of a magnetic head of the present invention. Such embodiments may be utilized in the disk drive described in relation to FIGS. 1–7 above, and were described briefly above in relation to FIGS. 2 and 4.

Figure 11:
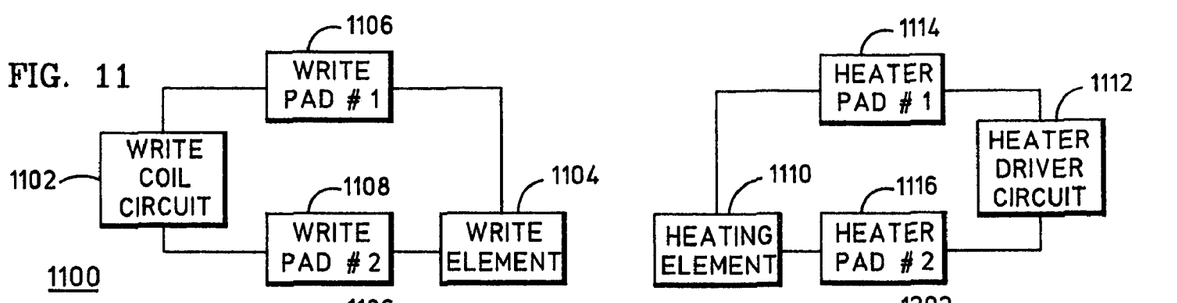
FIG. 11 is a schematic block diagram of a magnetic head and associated components for thermally-assisited writing of data to a disk in a first embodiment of the present invention.

In FIG. 11, a schematic block diagram of relevant components of a magnetic head 1100 in one embodiment of the present invention is shown. Magnetic head 1100 includes a write head element 1104 which writes data to a disk. A write coil circuit 1102, which includes a write coil, has two conductors which are coupled to write pads 1106 and 1108 through via connections. Write head element 1104 has leads which are also coupled to these write pads 1106 and 1108. Thus, write head element 1104 is coupled in parallel to write coil circuit 1102 in this fashion. Magnetic head 1100 also includes a read head element and read pads which are not shown in FIG. 11.

A heating element 1110 is also included in the circuit Write head element 1104 and heating element 1110 are contained inside magnetic head 1100 and located at or near the ABS (and the disk). These two elements may be positioned adjacent to one another or integrally formed together. Heater driver circuit 1112 has two conductors which are coupled to heater pads 1114 and 1116 through via connections, which are separate from the via connections from write coil circuit 1102. Heating element 1110 also has leads which are coupled to these heater pads 1114 and 1116. Thus, heating element 1110 is coupled in parallel to heater driver circuit 1112 in this fashion. In this embodiment, a magnetic head having a write head element, a read head element, and a heating element utilizes six (6) external via pads which are exposed on the magnetic head.

To drive heating element 1110, heater driver circuit 1112 may include conventional circuitry such as CMOS logic devices, bi-polar devices, and amplifiers. In one embodiment, heater driver circuit 1112 continually drives heating element 1110 so that it is heated to a fixed predetermined temperature throughout write modes, read modes, and idle modes of the disk drive. Alternatively, heater driver circuit 1112 begins to drive heating element 1110 just before or just as write coil circuit 1102 is energized for writing data to disk 1150 with write head element 1104. If a separate heater driver circuit is utilized, it may utilize an alternating current (A/C) circuit or a bimodal current driver to avoid electron migration and device degradation. In an alternate embodiment, heater driver circuit 1112 is connected to disk motor 36 or motor controller 38 of FIG. 3. The disk motor can serve as a current or voltage source that drives the heater if the power requirements are substantial. This assumes that the power of the heater is small (e.g. less than 10%) of the disk motor during operation.

Figure 12:
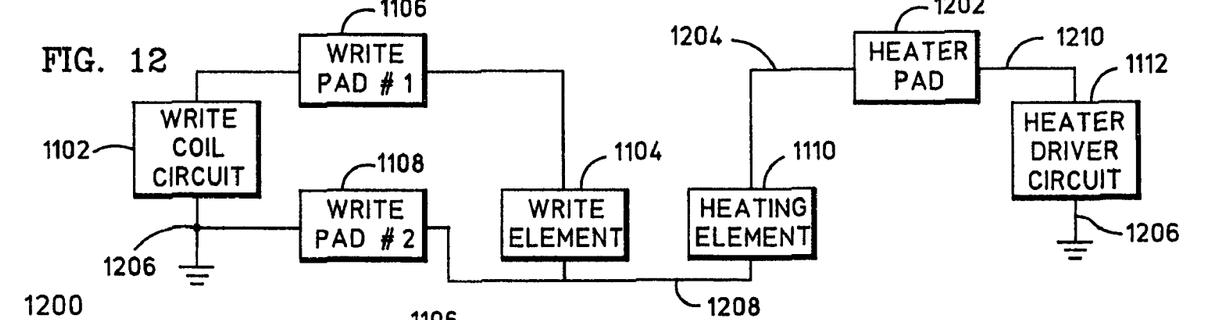
FIG. 12 is a schematic block diagram of a magnetic head and associated components for thermally-assisited writing in a second embodiment of the invention.

FIG. 12 is a schematic block diagram of relevant components of a magnetic head 1200 in another embodiment of the present invention. The components for writing data to the disk are the same as that shown and described in relation to FIG. 11. In the embodiment of FIG. 12, however, heater driver circuit 1112 has one connection which is coupled to a single heater pad 1202 through a single via connection 1210 and to another connection (for example, a ground 1206). Heating element 1110 has a first lead 1204 which is coupled to heater pad 1202 and a second lead 1208 which is coupled to write pad 1108. Write pad 1108 is in turn coupled to one end of write coil circuit 1102 or optionally ground 1206. Thus, heater driver circuit 1112 and write coil circuit 1102 can share common ground 1206 (or the same bias voltage), and the inclusion of heating element 1110 in magnetic head 1200 requires only a single additional via pad 1202. In this embodiment, a magnetic head having a write head element, a read head element, and a heating element requires only five (5) external via pads exposed on the magnetic head. Heater driver circuit 1112 operates in the same manner as that described in relation to FIG. 11. In this case, the heater and the writer are connected which may change the impedance of the write coil.

Figure 13:
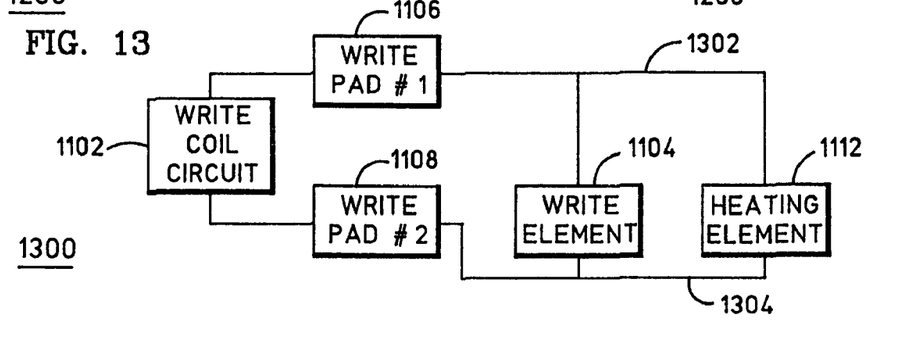
FIG. 13 is a schematic block diagram of a magnetic head and associated components for thermally-assisited writing in a third embodiment of the invention.
Figure 14:
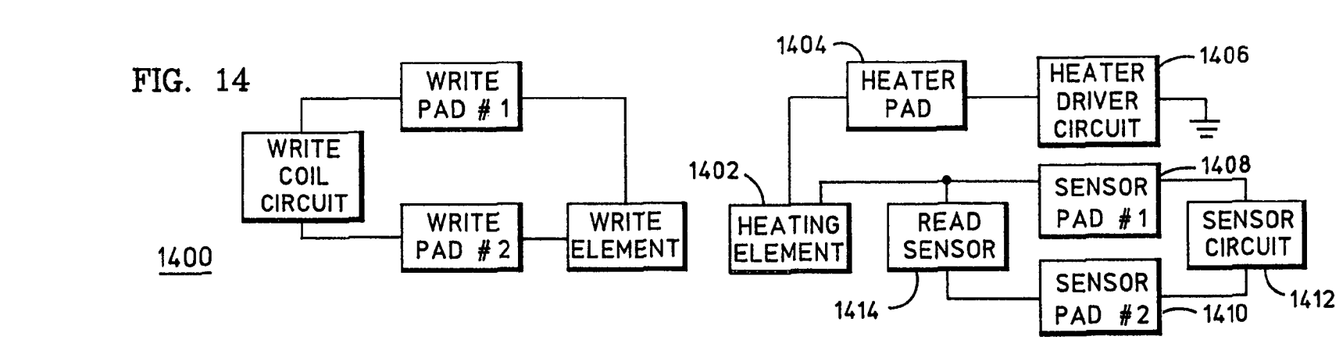
FIG. 14 is a schematic block diagram of a magnetic head and associated components for thermally-assisited writing in a fourth embodiment of the invention.
Figure 15:
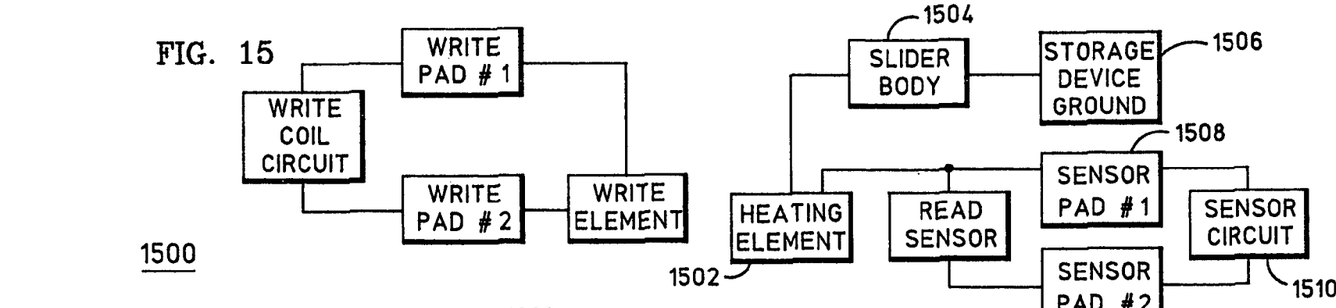
FIG. 15 is a schematic block diagram of a magnetic head and associated components for thermally-assisited writing in a fifth embodiment of the invention.

FIG. 13 is a schematic block diagram of relevant components of a magnetic head 1300 in yet another embodiment of the present invention. The components for writing data to the disk are substantially the same as that shown and described in relation to FIG. 11. Heating element 1110 has a first lead 1302 which is coupled to write pad 1106 and a second lead 1304 which is coupled to write pad 1108. Heating element 1110 is driven entirely by write coil circuit 1102 and is energized whenever write coil circuit 1102 is energized for writing data to disk 1105. In this embodiment, a magnetic head having a write head element, a read head element, and a heating element utilizes only 4 external via pads exposed on the magnetic head. Also, no separate heater driver circuit is necessary. However, this introduces some constraints such as only being able to heat while the coil is energized. Also, the impedance of the heater and the coil are coupled, which may limit the lower resistance of the heater. In addition, a device such as a capacitor or inductor may be incorporated in series or in parallel with the heating device and used to filter certain frequency components through the heating element.

Another alternate embodiment involves an electrical connection from the heating element to one of the read pads. This configuration is shown in a magnetic head 1400 of FIG. 14. A heating element 1402 is coupled to a heater pad 1404 and a heater driver circuit 1406 on the one hand, and a first read sensor pad 1408 on the other. First read sensor pad 1408 is normally used along with a second read sensor pad 1410 to couple a read sensor circuit 1412 to a read sensor 1414 which is exposed at the ABS. This configuration results in a slider having five (5) pads to the electronics. However, this separates the coil electronics from the heater electronics. The writing and heating operation is done at a separate time as the reading of the data. One drawback is the additional write connection to the heater (grounded, biased, or floating) to be common with the reader. This extra reader connection and wire act as an antenna and change the impedance of the sensor. The additional wire can also be a source of noise in the sensor.

Figure 16:
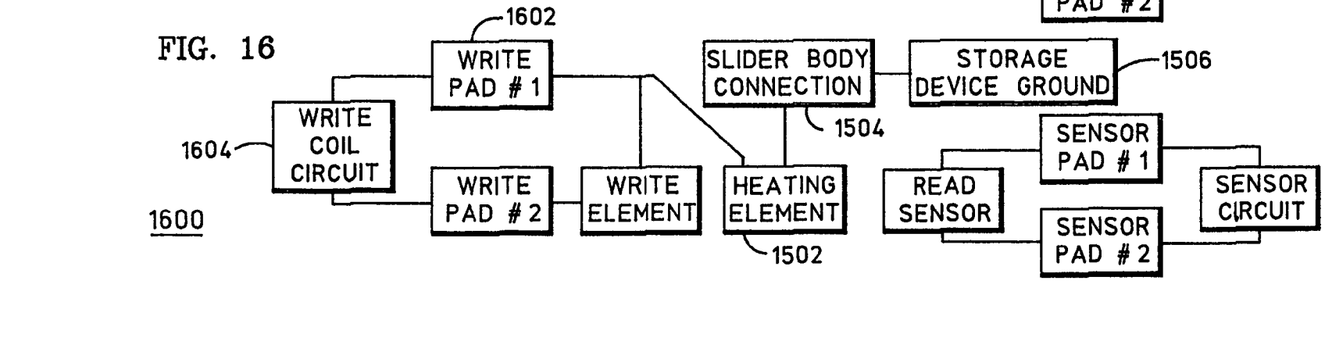
FIG. 16 is a schematic block diagram of a magnetic head and associated components for thermally-assisited writing in a sixth embodiment of the invention.
Figure 17:
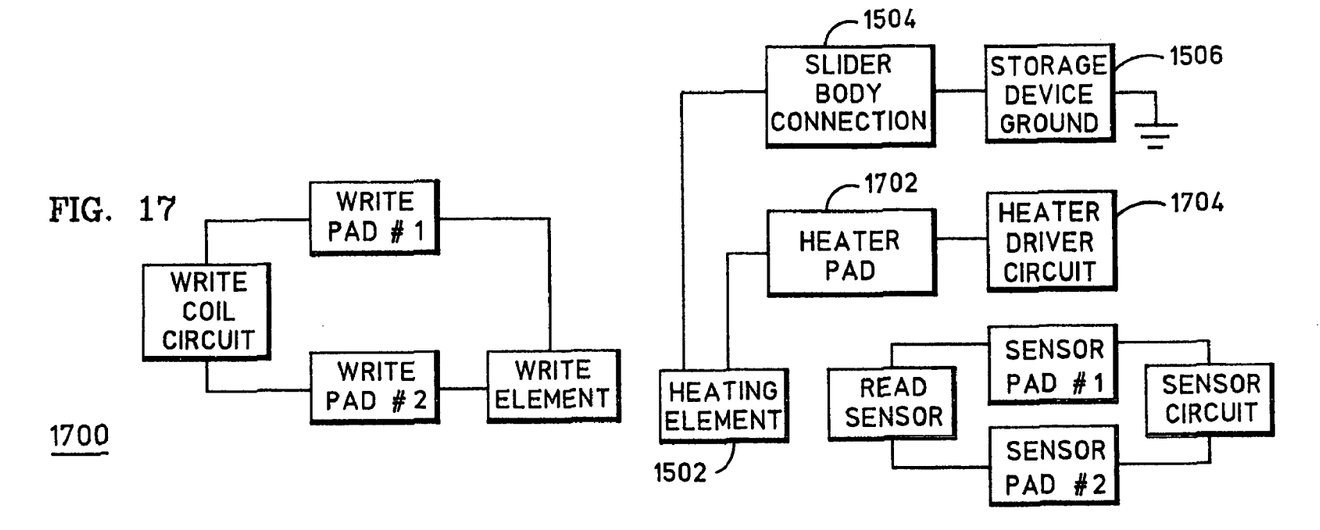
FIG. 17 is a schematic block diagram of a magnetic head and associated components for thermally-assisited writing in a seventh embodiment of the invention.
Figure 18:
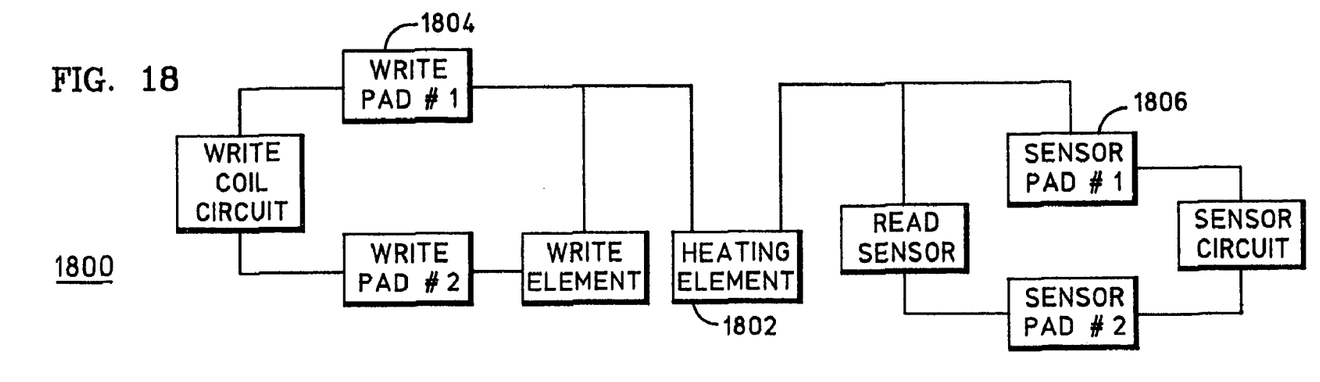
FIG. 18 is a schematic block diagram of a magnetic head and associated components for thermally-assisited writing in an eighth embodiment of the invention.

Even another alternate embodiment involves having a heater connection to a slider body which is kept at ground potential. A diagram of this configuration is shown in a magnetic head 1500 of FIG. 15. A heating element 1502 is coupled to a slider body 1504 which is in turn coupled to a ground 1506 of the storage device. Heating element 1502 is also coupled to one of read sensor pads 1508 and a read sensor circuit 1510. In lieu of a connection to read sensor pad 1508, as shown in FIG. 16 heating element 1502 may be coupled to a write pad 1602 and a write coil circuit 1604 in magnetic head 1600, or as shown in FIG. 17 to a separate heater pad 1702 and a heater driver circuit 1704 in magnetic head 1700. Because the slider body is kept at ground through electrical conductivity of the slider material, conductive glue, and suspension, the heater will need one less connection at the via connections. However, this introduces the constraint that the heater is relatively high resistance or impedance. This is due to the variability of connection resistance of the heater to the slider, slider to the suspension, and possible connection of the slider to the disk. To ensure that most of the heat is generated in the heater, the greatest resistance or impedance should be found in the heater device. Also, any excess voltage on the slider body may lead to an undesirable electrostatic discharge (ESD) event Preferably, the heater is operated with a DC current The other heater connection can be to a separate via, in contact with the write coil, or in contact with the read sensor.

Yet even another embodiment involves forming a connection between the write coil and the read sensor via the heater. This will also reduce the via connections needed on the surface of the slider. This arrangement is shown in a magnetic head 1800 of FIG. 18, which has a heating element 1802 coupled to a write pad 1804 and a read pad 1806. This introduces an additional complexity in the driver circuitry to electrically ground or float the necessary wires so that either the heater, write coil, or sensor is driven. The additional wires may also introduce noise into the sensor.

Figure 10:
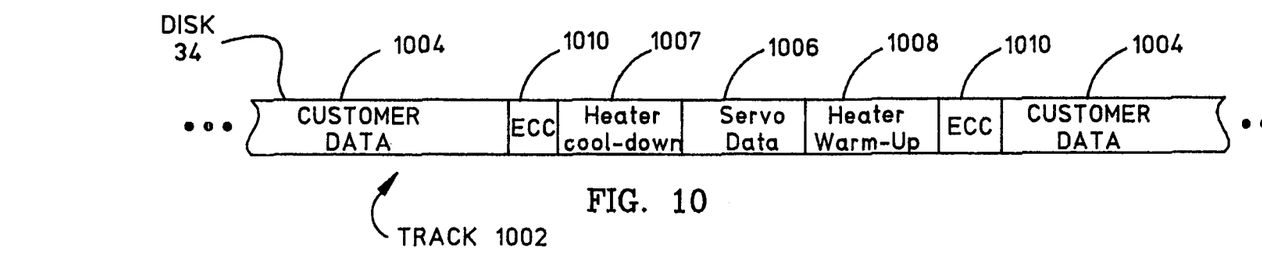
FIG. 10 is an illustration of a data format of the disk in one embodiment of the present invention.

Referring now to FIG. 10, a simplified illustration of a data format on a writable track of a disk is shown. This data format is based on an embodiment where the heating element is regularly deenergized, and reenergized just before writing data to customer data regions. If heating element is ordinarily kept energized, even during non-write modes, then this disk format may not be necessary. If the heating element is energized during all operations or all read/write operations, then the maximum heat is limited so that the combined thermal transfer to the disk will not erase data over the life of the device.

On track 1002 of FIG. 10, a heater warm-up region 1008 is reserved between each servo data region 1006 and customer data region 1004. Also shown in FIG. 10 are error correction code regions 1010 on track 1002. The amount of space made available in warm-up region 1008 is suitable to cover the finite amount of time it takes for the heating element to reach a predetermined steady-state temperature after being energized. The heating element is energized after servo data region 1006 fully passes underneath it and when heater warm-up region 1008 is underneath it Heater warm-up region 1008 is sufficiently sized such that, by the time the disk is rotated for writing data to a writable portion (writable portion 910 of FIG. 9), the heating element has reached the predetermined steady-state temperature. Since it may take between about 1 and 100 nanoseconds to reach the steady-state temperature, each heater warm-up region 1008 may be between about 10 and 1000 nanometers in length.

There also may be the need to have a cool-down region 1007 so that the following servo data will not be erased after the data is written. This corresponding cool-down region 1007 may have a length similar to that of heater warm-up region 1008. Although only a single portion of track 1002 is illustrated in FIG. 10, the format and regions shown are repeated throughout disk 34.

In one embodiment, the heating element has the following characteristics:
Volume (V)=10.sup.-13 cc,
Density (D)=10 g/cc,
Heat Coefficient (H)=0.3 J/g-C,
Temperature (T)=300.degree. C., and
Power Dissipation (P)=10 mW=0.01 J/s such that a characteristic time VDHT/P for the heating element to reach a steady-state temperature is on the order of 10 nanoseconds. Thus, if the magnetic head is moving over the disk at 30 meters per second (m/s), then the required space for each heater warm-up region 1008 (and/or cool-down region 1007) is about 300 nanometers.

Thus, a magnetic head for thermally-assisted writing of data to a disk has been described. The magnetic head may include a write head element and a heating element which is a resistive infared radiator or thermal conductor. The heating element is coupled to at least one via pad which is exposed on an outer surface of the magnetic head. This via pad may be the same pad utilized for the write head element or a read sensor of the magnetic head. The heating element is formed beneath the pole tip such that it is able to transfer heat to a portion of the disk before the write head element can write data to it. Advantageously, the heater facilitates the writing of data to high coercivity media.

Also, a magnetic disk for use with such a recording device may have a plurality of customer data regions and a plurality of heater warm-up regions interleaved with the plurality of customer data regions. Each heater warm-up region is sufficiently sized for the amount of time it takes a heating element of the recording device to produce sufficient heat for writing data to the magnetic disk. A plurality of heater cool-down regions may also be interleaved with the plurality of customer data regions, where each heater cool-down region is sufficiently sized for the amount of time it takes a heating element of the recording device to lose sufficient heat so that data on the disk remains unerased.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
a write head element having a pole tip;
a heating element; the heating element being:
formed on or within the pole tip; and
electrically coupled to at least one via pad on an outer surface of the magnetic head,
the magnetic head being suitable for use with: a magnetic disk having heater warm-up regions sufficiently sized for the amount of time it takes the heating element to produce sufficient heat for writing data to the magnetic disk.

2. A magnetic head, comprising:
a write head element having a pole tip;
a heating element; the heating element being;
formed on or within the pole tip; and
electrically coupled to at least one via pad on an outer surface of the magnetic head,
the magnetic head being suitable for use with: a magnetic disk having heater cool-down regions sufficiently sized for the amount of time it takes the heating element to lose sufficient heat so that data on the magnetic disk remains unerased.

* * * * *